(12) United States Patent
Kirkby et al.

(10) Patent No.: US 8,583,703 B2
(45) Date of Patent: Nov. 12, 2013

(54) CONTENT ASSET MANAGER

(75) Inventors: Stephen Denis Kirkby, Unley Park (AU); Thaddaeus J. Parker, Chicago, IL (US); Brian C. Vokoun, La Grange, KY (US); Gregory W. Inks, Cary, NC (US); David Walter Maclean Skinner, Scottish Borders (GB)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 13/222,410

(22) Filed: Aug. 31, 2011

(65) Prior Publication Data

US 2012/0066268 A1  Mar. 15, 2012

Related U.S. Application Data

(60) Provisional application No. 61/382,767, filed on Sep. 14, 2010.

(51) Int. Cl.
*G06F 7/00* (2006.01)

(52) U.S. Cl.
USPC ............................ 707/803; 709/223; 709/224

(58) Field of Classification Search
USPC ............................ 707/790–811; 709/223, 224
See application file for complete search history.

(56) References Cited

U.S. PATENT DOCUMENTS

| | | | |
|---|---|---|---|
| 2003/0033378 A1 | 2/2003 | Needham et al. | |
| 2008/0066080 A1* | 3/2008 | Campbell | 719/314 |
| 2008/0229428 A1* | 9/2008 | Camiel | 726/27 |
| 2009/0044192 A1* | 2/2009 | Gupta et al. | 718/102 |

OTHER PUBLICATIONS

"What ASP.NET Programmers Should Know About Application Domains", OdeToCode.com, Dec. 6, 2004.
"Second Search Report on Australian Application No. 2011224001", Australian Patent Office, May 29, 2013.

* cited by examiner

*Primary Examiner* — Usmaan Saeed
*Assistant Examiner* — Tuan-Khanh Phan
(74) *Attorney, Agent, or Firm* — Mannava & Kang, P.C.

(57) ABSTRACT

A content asset manager (CAM) system manages content to be developed. CAM includes a data repository storing static assets and page assets operable to be used in a web site developed in a code editing system. A web service interfaces the CAM system with the code editing system and provides the code editing system with access to at least some of the static assets stored in the data repository. A slot database includes a plurality of independent slots, and a slot stores data to be used for the web site at runtime. A content manager retrieves the code for the web site from the data repository and stores the code for the web site in the slot for the web site in the slot database. The web site may be deployed using data in the slot.

18 Claims, 17 Drawing Sheets

CAM: ARTICLE (EDIT) 405

ARTICLE DETAILS

NAME: ARE YOU USING TO MUCH DISH SOAP?
SHORT DESCRIPTION: PROBABLY. THINK YOU KNOW HOW TO WASH YOUR DISHES?
LONG DESCRIPTION:

FONT NAME ▼ |S ▼ | A ▼ | ✎ | B / U | ▤ ▼ ▨ ✂ 🖇
▤ ▤ ▤ | ≡ ≡ ≡ | ¶ ¶ ¶ ▼

MORE ISN'T ALWAYS BETTER, AND TOO MUCH SOAP CAN JUST LEAVE A CLOUDY FILM ON YOUR DISHES

</> DESIGN | <> HTML | 🔍 PREVIEW

BODY:

FONT NAME ▼ |S ▼ | A ▼ | ✎ | B / U | ▤ ▼ ▨ ✂ 🖇
▤ ▤ ▤ | ≡ ≡ ≡ | ¶ ¶ ¶ ▼

TODAY'S DISHWASHERS HAVE COME A LONG WAY SINCE WE FIRST LEARNED THE ART OF LOADING DIRTY DISHES. NOT ONLY ARE DISHWASHERS THEMSELVES MORE EFFICIENT, BUT SO IS THE ACCENT DISH SOAP WE'RE PUTTING IN THEM. IN THIS CASE, MORE ISN'T ALWAYS BETTER, AND TOO MUCH SOAP CAN JUST LEAVE A CLOUDY FILM ON YOUR DISHES.

WE WERE ALSO SURPRISED TO LEARN THAT PRE-RINSING DISHES MIGHT JUST BE A THING OF THE PAST. ACCENT DISH SOAP ACTUALLY NEEDS SOMETHING TO WORK

---

406

ARTICLE DETAILS

ENABLED: ☑
SMALL IMAGE URL: DYNAMICASSETS/ARTICLES/DISHWASHER-SMALL.JPG [BROWSE]
SMALL IMAGE ALT TEXT: DISH WASHING
LARGE IMAGE URL: DYNAMICASSETS/ARTICLES/DISHWASHER.JPG [BROWSE]
LARGE IMAGE ALT TEXT: DISH WASHING
EXTERNAL REFERENCE URL:
EXTERNAL REFERENCE NAME:
SEO METADATA
META TITLE: ARE YOU USING TOO MUCH DISH SOAP
META KEYWORDS:
META DESCRIPTION:
EXTERNAL URL:
PUBLISHING
START DATE: [       ] 12 AM ▼ 00 ▼
END DATE: [       ] 12 AM ▼ 00 ▼
COMMENTS:

ARTICLE

CUSTOM ATTRIBUTES

TOPIC [DISH SOAP] ✕
[ADD]

[SAVE] [DELETE ITEM] [CANCEL] [COPY]

*FIG. 4G*

CAM: CATALOG

SITE ACTIONS ▼ | BROWSE | PAGE      SEARCH THIS SITE 🔍    TFSA\GREG.LINKS ▼ accenture
HIGH PERFORMANCE DELIVERED     ACCENTURE INTELLIGENT DIGITAL PLATFORM
          COPYRIGHT ACCENTURE © ALL RIGHTS RESERVED MY PROJECTS   DOCUMENTS & ASSETS   SITE CONTENT   SLOT DEPLOYMENT   PACKAGES   USER DATA     SITECONTENT

ARTICLE LIST | ACCENT HOME CLEAN (P1T1)
FAQS-EN-GB
FAQS-EN-US    SLOT CONFIGURATION   SITE HEALTH   CHANGE SLOT   PREVIEW SLOT    ALL TIMES IN UTC. CURRENT TIME IS: 08:01
SU-NE-SPIT
TIPS-EN-GB    MARKETING CATALOGS

CUSTOM LISTS
CITIES LIST
COUNTRY LIST

| NAME △ | CATEGORIES | PRODUCTS | LAST MODIFIED BY | LAST MODIFIED ON |
|---|---|---|---|---|
| ACCENT SOAP CATALOG-EN-GB | 3 | 9 | | 01-JAN-0001 00:00 |
| SU-NE-GOLATAC PA05 TNECCA | 3 | 9 | | 01-JAN-0001 00:00 |

ADD NEW

FEATURED
PRODUCTS-EN-GB
FEATURED
PRODUCTS-EN-US
PAGEMETADATA-
S-EN-GB
PAGEMETADATA-
S-EN-US

**MARKETING
CATALOGS**

CAM: SLOT MANAGEMENT

SITE ACTIONS ▾  📄 BROWSE | PAGE        | SEARCH THIS SITE    🔎 |        TFSA\GREG.LINKS ▾  ⊗ accenture                                                                ACCENTURE INTELLIGENT DIGITAL PLATFORM
HIGH PERFORMANCE DELIVERED                                                       COPYRIGHT ACCENTURE © ALL RIGHTS RESERVED MY PROJECTS   DOCUMENTS & ASSETS   SITE CONTENT   [SLOT DEPLOYMENT]   PACKAGES   USER DATA                    DEPLOYMENT

ACCENT HOME CLEAN (P1T1)

SLOT CONFIGURATION   SITE HEALTH   CHANGE SLOT   PREVIEW SLOT   ALL TIMES IN UTC. CURRENT TIME IS: 7:42

CURRENT CONFIGURATION: REFERENCESITE.PT.IDP.PROD

STATUS: STARTED   ▷ ▫ ᴄ

ACCENTURE.IDP.REFERENCESITE.ZIP (4)
DEPLOYED BY: IDP\ADMINISTRATOR ON AT 04:06
COMMENT: INITIAL BUILD 2.0 DROP2 UPLOAD
WEB CONFIGURATION
DEPLOYED BY: IDP\ADMINISTRATOR ON AT 09:07
SYSTEM SETTINGS CONFIGURATION
DEPLOYED BY: IDP\ADMINISTRATOR ON AT 09:16
APPLICATION SETTINGS CONFIGURATION
DEPLOYED BY: IDP\ADMINISTRATOR ON AT 09:17

[ DEPLOY ]

SLOT HISTORY

| DATE | ACTION | BY |
|---|---|---|
| AT 16:16 | SITE STARTED | TFSA\LINDA.SKROCKI |
| AT 16:13 | COMMENT: SLOT RECYCLED SITE STARTED | TFSA\LINDA.SKROCKI |
| AT 16:12 | COMMENT: SLOT RECYCLED SITE STARTED | TFSA\LINDA.SKROCKI |
| AT 19:34 | COMMENT: SLOT RECYCLED SITE STARTED | TFSA\GREG.INKS |
| AT 19:34 | COMMENT: SLOT RECYCLED SITE STARTED | TFSA\GREG.INKS |
| AT 19:31 | COMMENT: SLOT RECYCLED SITE STARTED | TFSA\GREG.INKS |

FIG. 4J

| CAM: AUDIT HISTORY | | | | | |
|---|---|---|---|---|---|
| SITE ACTIONS ▾   BROWSE   PAGE | | | SEARCH THIS SITE | | TFSA\GREG.LINKS ▾ |
| accenture | | | | | ACCENTURE INTELLIGENT DIGITAL PLATFORM |
| HIGH PERFORMANCE DELIVERED | | | | | COPYRIGHT ACCENTURE © ALL RIGHTS RESERVED |
| MY PROJECTS   DOCUMENTS & ASSETS   SITE CONTENT   SLOT DEPLOYMENT   PACKAGES   USER DATA | | | | | USERDATA |

| MANGE USERS | ACCENT HOME CLEAN (P1T1) |
|---|---|
| VIEW AUDIT HISTORY | SLOT CONFIGURATION   SITE HEALTH   CHANGE SLOT   PREVIEW SLOT   ALL TIMES IN UTC. CURRENT TIME IS: 7:48 |

VIEW AUDIT HISTORY

EVENT TYPE:   [✓CREATE / DELETE / LOCKED OUT / LOG OFF / PASSWORDCHANGED / PASSWORDRESET / UNLOCK / UPDATE]   ON ITEM TYPE (TARGET):

BY USER:                                           NAME OF ITEM ACTED ON:

DATA RANGE FROM:          TO: 2:48:00 AM

CORRELATION ID:                                                                    ITEMS PER PAGE: 25          SEARCH

| DATE ▽ | EVENT TYPE | TARGET | ACTED ON | USER | DETAILS |
|---|---|---|---|---|---|
| 7:25:04 PM | CREATE | ARTICLEIMAGES | GREG TEST NAME | TFSA\GREGINKS | VIEW DETAILS |
| 7:25:03 PM | CREATE | ARTICLES | GREG TEST NAME | TFSA\GREGINKS | VIEW DETAILS |
| 9:55:00 AM | CREATE | EXTENDEDPROPERTIES | IS SIGNED UP FOR NEWSLETTER | 1DP\P1T1WEBPOOL | VIEW DETAILS |
| 9:55:00 AM | CREATE | PERSONALPROFILES | 1 | 1DP\P1T1WEBPOOL | VIEW DETAILS |
| 9:20:26 AM | CREATE | EXTENDEDPROPERTIES | IS SIGNED UP FOR NEWSLETTER | 1DP\P1T1WEBPOOL | VIEW DETAILS |
| 9:20:25 AM | CREATE | PERSONALPROFILES | 2 | 1DP\P1T1WEBPOOL | VIEW DETAILS |
| 9:20:20 AM | CREATE | MEMBERSHIPUSERS | USER1@TEST.COM | 1DP\P1T1WEBPOOL | VIEW DETAILS |
| 9:12:01 AM | CREATE | MEMBERSHIPUSERS | USER@TEST.COM | 1DP\P1T1WEBPOOL | VIEW DETAILS |

*FIG. 4K*

CONTENT ASSET MANAGER

PRIORITY

The present application claims priority to U.S. Provisional Patent Application Ser. No. 61/382,767 filed Sep. 14, 2010, which is incorporated by reference in its entirety.

BACKGROUND

A content management system (CMS) typically includes computer software for organizing and facilitating collaborative creation of documents and other content. Commonly, a CMS is used as a tool for end users to prepare and publish content for one or more websites without needing to prepare HTML code. In these instances, the CMS provides an easy-to-use interface that allows end users to change text, images, or other content in a template, and then publish the information to the website.

These website CMS's are excellent tools for end users to manage their own websites. However, the website CMS falls short when the user is a software web developer that desires to use the CMS to develop a web site. Developers need a more functional interface for coding rather than an interface that is primarily used to change content. For example, a developer may need to modify the layout of a web page which may not be possible through a website CMS interface designed for end users. Furthermore, developers may work in a collaborative environment, including testing and staging environments. Typically, a website CMS is not designed to interface with tools used in these environments.

BRIEF DESCRIPTION OF DRAWINGS

The embodiments of the invention will be described in detail in the following description with reference to the following figures.

FIGS. 4A-K illustrate screen shots generated by the content asset manager user interface;

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

1. Overview

According to an embodiment, a content asset manager (CAM) is an extensible knowledge management solution designed to assist with the construction of content into a format suitable for any web friendly channel but in a way that is intimately linked to development and management tools. CAM provides for collaboration among web developers, asset creators, managers and other people to create, deploy and manage web sites or content for other applications.

CAM is described below generally with respect to the creation of a web site. However, CAM may be used to create and edit any type of content, including product catalogs, news articles, etc. CAM creates and manages underlying data stores of assets that may be used to create the content.

2. System

Figure 1:
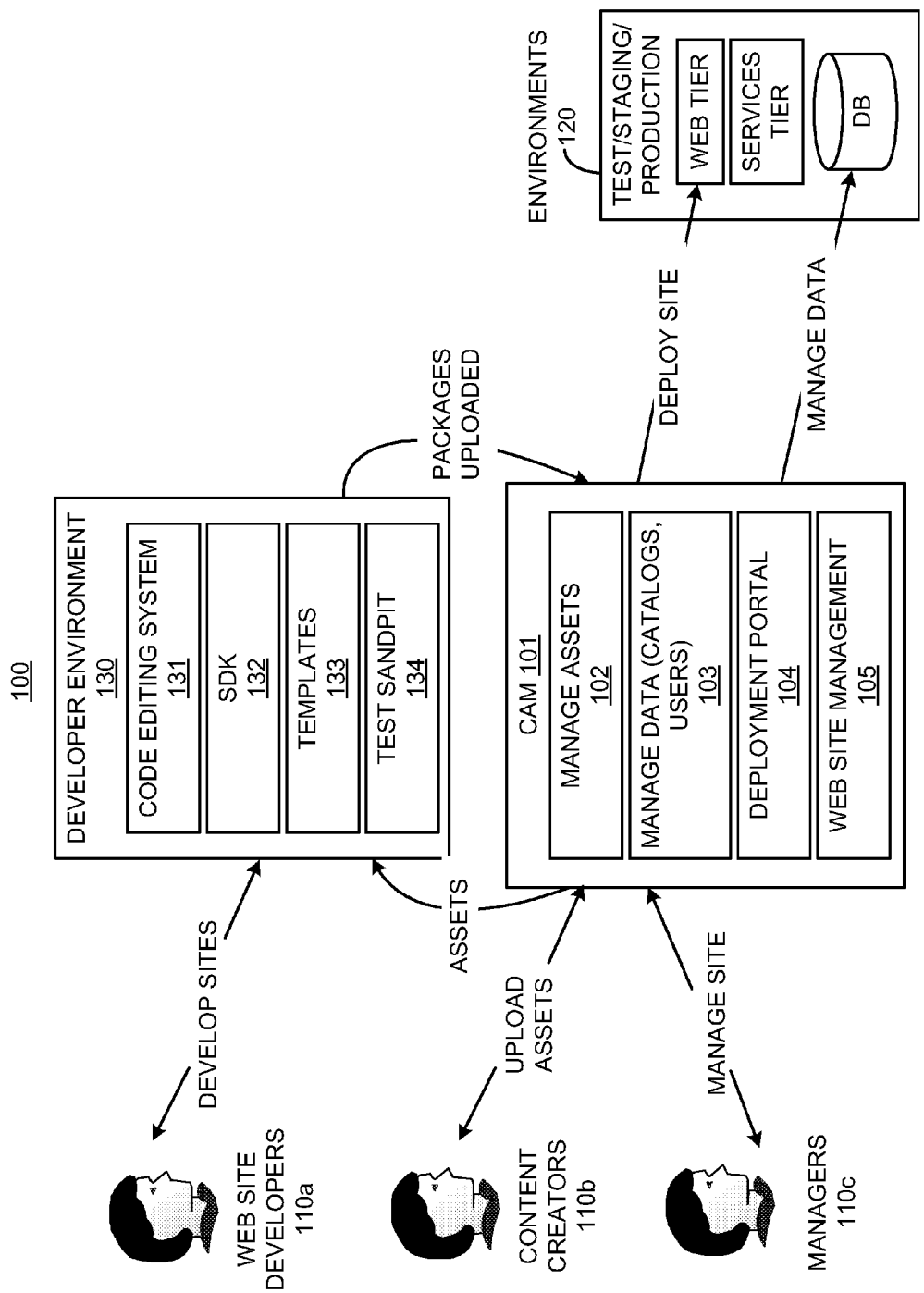
FIG. 1 illustrates a system, according to an embodiment.

FIG. 1 illustrates a system 100 showing CAM 101 interfacing with different types of users, a software development application and environments, including testing, staging and production environments. Some of the functionality of CAM 101 is represented by blocks 102-105. For example, CAM 101 manages assets, shown as 102. Assets are content, which may be used in web site, such as images, text, video, banners, etc. The assets may be created and uploaded by content creators 110b. Content creators may be artists or other people responsible for providing content.

CAM 101 also manages other types of data, shown as 103. The other types of data may include asset compilations, such as catalogs, user data, which may include user privileges, login data, and other user profile information, and any other data used by CAM 101 to perform its functions.

CAM 101 may deploy web sites, shown as 104, once they are created, and CAM 101 may manage the deployed web sites, shown as 105. Managers 110c or other users can interface with CAM 101 to invoke web site deployment and perform web site management. Deployment may include deployment in a production environment or in pre-production environments, such as testing and staging environments. The environments are shown as 120, and may include multi-tiered systems, such as enterprise systems. A web tier, a services tier and a database tier are shown as examples of tiers in an environment for deployment. As part of deployment, CAM 101 may provide configuration files, code and assets for a web site created through CAM 101 to the web tier and database tier in the production environment, which is a runtime environment. Then, the web site may be deployed and accessed by visitors via the Internet.

Web site management 105 may include scheduling jobs to update content on the web site. For example, a user may select a new image for a web site through CAM 101 and schedule a job to update the image on the production database so the web site is updated. In one example, a user wants to change a product catalog image. The user connects to a testing slot in a slot database, described in further detail below, and uploads the image to the testing slot. The user edits the product catalog record to point to the new image and saves the record. The user previews the change in the testing slot via their web browser, and then the user schedules a job to move the image from the testing slot to a production slot in the slot database. A user may schedule other types of jobs as well through CAM 101.

CAM 101 also provides a web service for interfacing with the developer environment 130. Developers 110a are shown interfacing with the developer environment, which may include an off-the-shelf code editing system 131, such as Visual Studio provided by MICROSOFT. In this example, the web service may be an application programming interface created with Windows Communication Foundation.

CAM 101 provides a software development kit (SDK) 132 that provides interfaces within the code editing system 131, such as menus, buttons, etc., that invoke functionalities provided by CAM 101. For example, the SDK 101 may generate a drop down menu in the code editing system 131 that presents assets to the developer that may be used in the web site. The SDK 132 may make templates 133 managed by CAM 101 available to the developer. The templates 133 comprise information that may be re-purposed for use in creating content, such as a web site. The templates 133 may be a reference site that a developer may start with when creating a new site, or the templates 133 may include portions of a web page. The templates 133 may include Java script, HTML, style sheets, etc. The SDK 132 also automatically includes references and dlls for references for services, controls, pages, etc.

For example, rules for site building are made available to the code editing system 131 via the CAM 101 and may be enforced through the CAM 101. The rules, for example, ensure the correct asset is applied to a current page using asset IDs. A developer may access remote repositories and application pages with metadata via CAM 101. CAM 101 updates the components in each application page with the metadata and other aspects of the asset gleaned from a repository.

The test sandpit 134 may include a sandbox provided by CAM 101 for test code. The SDK 132 generates the test sandpit 134, which is a testing environment that may emulates the production environment for testing content. After testing, the developer may generate packages of code and assets for a web site and provide it to CAM 101, and then CAM 101 may deploy the web site in a production environment.

Figure 2:
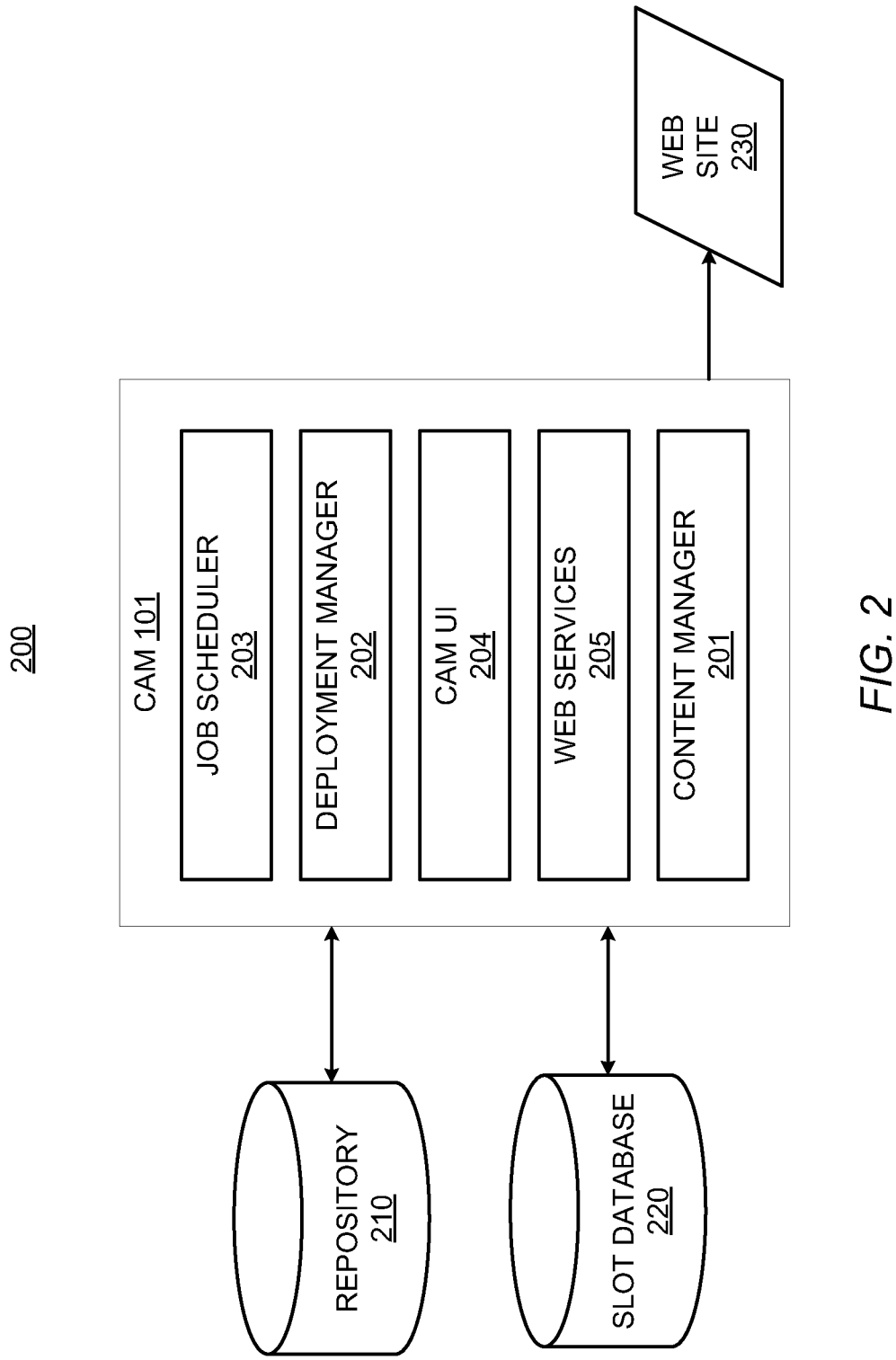
FIG. 2 illustrates a content asset manager system, according to an embodiment.

FIG. 2 shows a more detailed block diagram of CAM 101. CAM 101 may include a content manager 201, deployment manager 202, job scheduler 203, user interface (UI) 204 and web services 205.

CAM 101 stores assets in repository 210 and slot database 220. The repository 210 may be a database or other storage system. The repository 210 may be provided by a collaborative environment system, such as SHAREPOINT. The repository 210 may store any data used for creating content, deploying content and using the content in a runtime environment. The repository 210 may comprise one or more repositories. The data may include static assets and page assets. The slot database 220 may include virtual containers in the environments 120 shown in FIG. 1, which may include production environments, testing and staging environments, etc. The slot database 220 includes slots, each of which may include a virtual container that holds assets, code and other data. For example, a slot in the production environment may include a database and a web server. Each slot in the slot database 220 may be independent. For example, information in a slot may not be accessible by applications in other slots. By way of example, a slot may be created per web site, per multiple web sites, or as a data editing slot for large volumes of data. Privileges to the slot may be assigned for individuals, including slot access and creation privileges. A slot may be used to prevent tampering and keep client data separate or to mange applications. For example, an administrator can switch one web site off in one slot while not affecting a web site in any other slot.

The content manager 201 manages the assets in the repository and controls how the assets may be used to create content, such as the web site 230. The content manager 201 categorizes assets as page assets or static assets and controls access to the assets according to their categories. Static assets are allowed to be moved into the code editing system 131 shown in FIG. 1 and become a static part of the web site 230. Generally, a static asset is in the domain of the developer and page assets are not. A static asset may be added, removed or modified in the developer domain, such as the code editing system 131. The static asset may become part of the code for the web site 230. A static asset is stored on the file structure of the web server in the production environment so the web site 230 can be rendered on a visitor's browser from the web server. A static may not be changed for the web site 230 unless it is modified in the developer domain and then stored again in the production environment. A page asset may also be incorporated into the web site 230, but the page asset is not allowed to be brought into the code editing system 131. The page asset may be stored in a production slot in the slot database 220 and rendered on the web browser. For example, the code for the web site 230 may include a pointer to a page asset, which is retrieved from the slot to render the web site 230. The page asset may be changed on a regular basis by changing the page asset in the slot through CAM 101 rather than through the developer domain. For example, a news article has a title, description and headline image. The headline image may be a page asset in the slot database 220 and rendered out of the slot database 220 by the content manager 201 as needed. The title and description are coded and static and cannot be edited unless you are the developer modifying the news article via the code editing system 131 but the headline image may be modified in the slot database 220 as needed by the user through CAM 101. A page asset may also include a dynamic asset. A dynamic asset may include meta data that can used to make decisions for the asset based on rules. In one example, the dynamic asset includes meta data comprised of a publish end date attribute and a background color attribute. Based on a rule, a dynamic asset may be selected to be included in the web site 230 if the background color is equal to green and if the publish end date has not been reached.

The content manager 201 allows the content creators 110b shown in FIG. 1 to upload assets into the repository 210 and assets are moved to the slot database 220 as needed if the assets are to be used in the web site 230. For example, the content manager 201 retrieves code for the web site 230 from the data repository 210 and stores the code for the web site 230 in a slot for the web site 230 in the slot database 210. The content manager 201 may determine if the web site includes page assets. For example, the project folder for the web site 230 may include page assets that are to be included in the web site content. A table or other data structure may be stored for the project in the repository 210 that identifies all assets for the web site 230 or metadata may be stored for each asset that identifies the projects for the asset. If page assets are to be included in the web site 230, the content manager 201 provides the page assets in the slot for the web site 230. The page assets in the slot may be the actual assets or pointers to the assets.

The content manager 201 also allows the managers 110c and other users to manage the web site 230. The content manager 201 also creates logical schemas. A logical schema is a data structure including custom attributes. A user may select the types of data to be included in a logical schema. For example, a logical schema may be created for customer case references. The logical schema may include customer name, customer rating, and location. The logical schema may be included in other assets. For example, a logical schema may be included in an article. The logical schema may also operate as a template that can be inherited in an article. The content manager 201 stores the logical schemas in the repository 210. A logical schema may be created by starting with a base schema and then adding various attributes to the base schema.

After the web site 230 is created in the code editing system 130, a package including configuration files is generated. The deployment manager 202 deploys the package in the production environment. The package may include configuration files for the web server, the code and other data.

The job scheduler 203 schedules jobs to be performed for the deployed web site 230. For example, the job scheduler 203 synchronizes the slot database 220 to external systems to update the slot database 220 with new prices and images as needed, so these new images and prices are displayed at the web site 230 as page assets. The job scheduler 203 may store the assets directly into the slot database 220 or the job scheduler 203 may store the assets into the repository 210 and CAM 101 updates the slot database 220 with the assets. An update may include storing a new asset, revising an existing asset and/or removing an asset, for example, from a slot. The user interface allows a user to interface with the job scheduler to create jobs. A job may include a task to be performed at one or more predetermined times. Scripts may be used to execute the tasks. For example, a SQL script may be used to store information in the slot database.

The CAM UI 204 may include a graphic user interface generated by CAM 101 for multiple functions. Examples of information provided via the CAM UI 204 is further described below.

The web services 205 may include application program interfaces (APIs) for interfacing with the repository 210 and with the code editing system 131 shown in FIG. 1. For example, one of the web services 205 may include APIs for the code editing system 131. The web service interfaces CAM 101 with the code editing system 131 through an API for the code editing system 131 and makes certain folders in the repository 210 available for viewing and accessing in a UI in the code editing system 131. The web service also allows code, including one or more static assets, for the web site developed in the code editing system to be provided to CAM 101 and stored in the repository 210.

3. UI Functions

Figure 3:
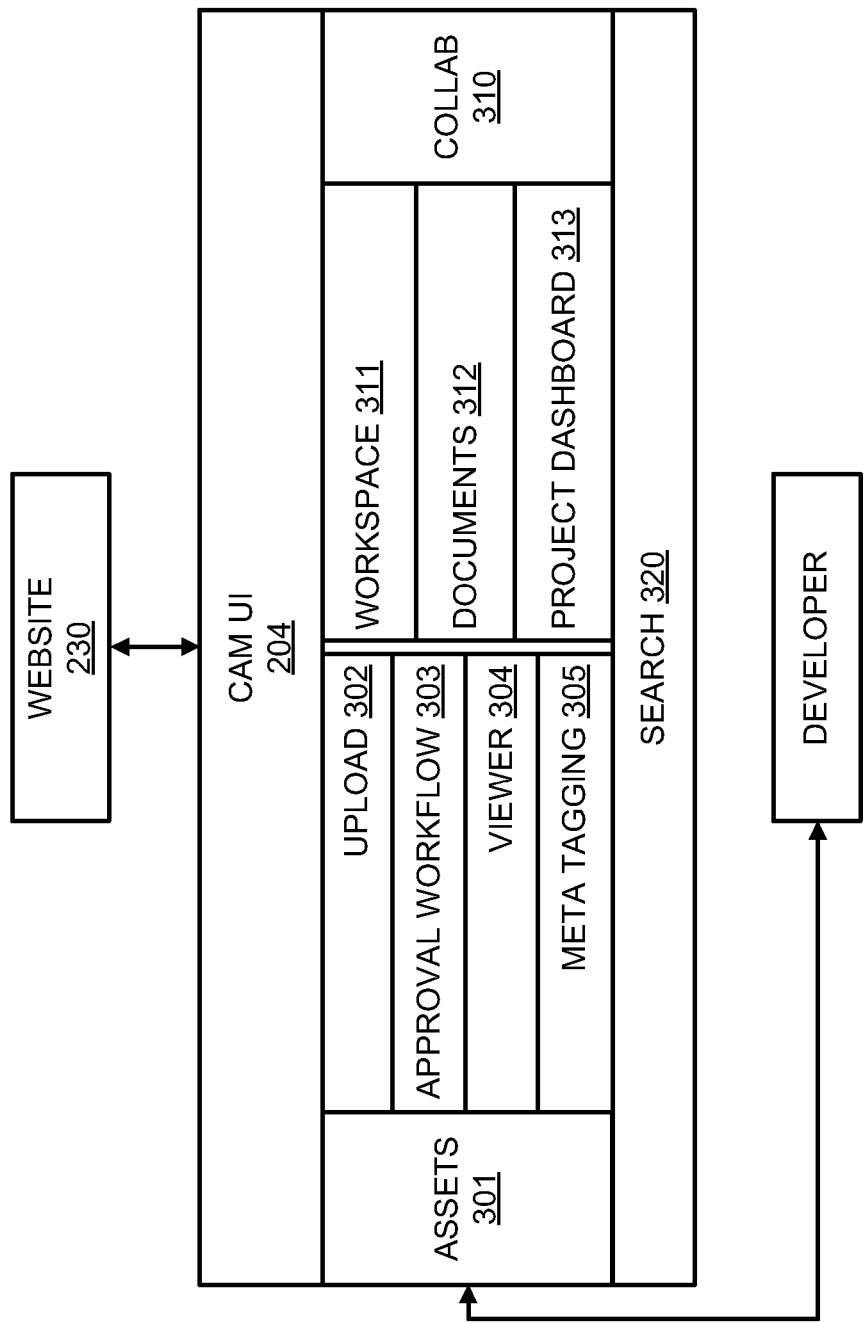
FIG. 3 illustrates functions of a user interface for the content asset manager system, according to an embodiment.

FIG. 3 shows some functions that may be performed by the CAM UI 204 shown in FIG. 2. The asset functions 301 include creating and uploading 302 assets into the repository 210 and providing static assets to the code editing system 131 shown in FIG. 1. Other asset functions include workflow approval 303, viewer 304 and meta tagging 305. Workflow approval 303 may include a manager or other user viewing the progress of development and approving stages of development. Viewer 304 allows a user to view assets and the web site 230 being created. Meta tagging 305 may include tagging of assets with their attributes or characteristics. Meta tagging 305 may include identifying whether an asset is a page asset or a static asset, or identifying whether an asset is a page asset or a static asset is determined based on the folder or location in data storage the asset is stored. For example, predetermined locations are for page assets and predetermined locations are static assets.

The collaborative functions 310 may include functions for sharing and managing access to workspace 311 and documents 312. The project dashboard 313 is a dashboard which may be used for collaboration or asset management. Search 320 represents search capability for searching assets or collaborative environment in CAM 101.

4. Screenshots of UIs

Figure 4A:
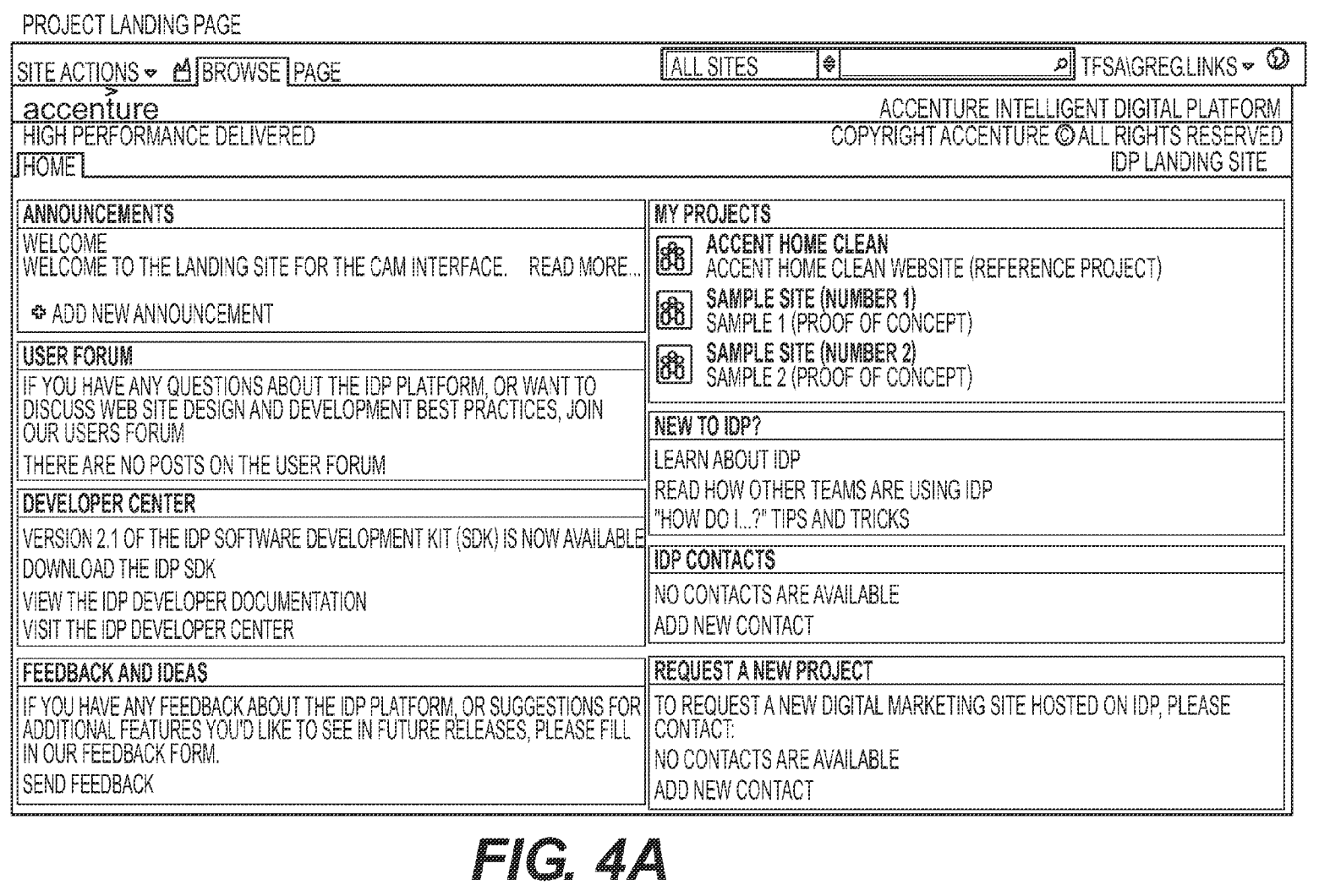
Figure 4B:
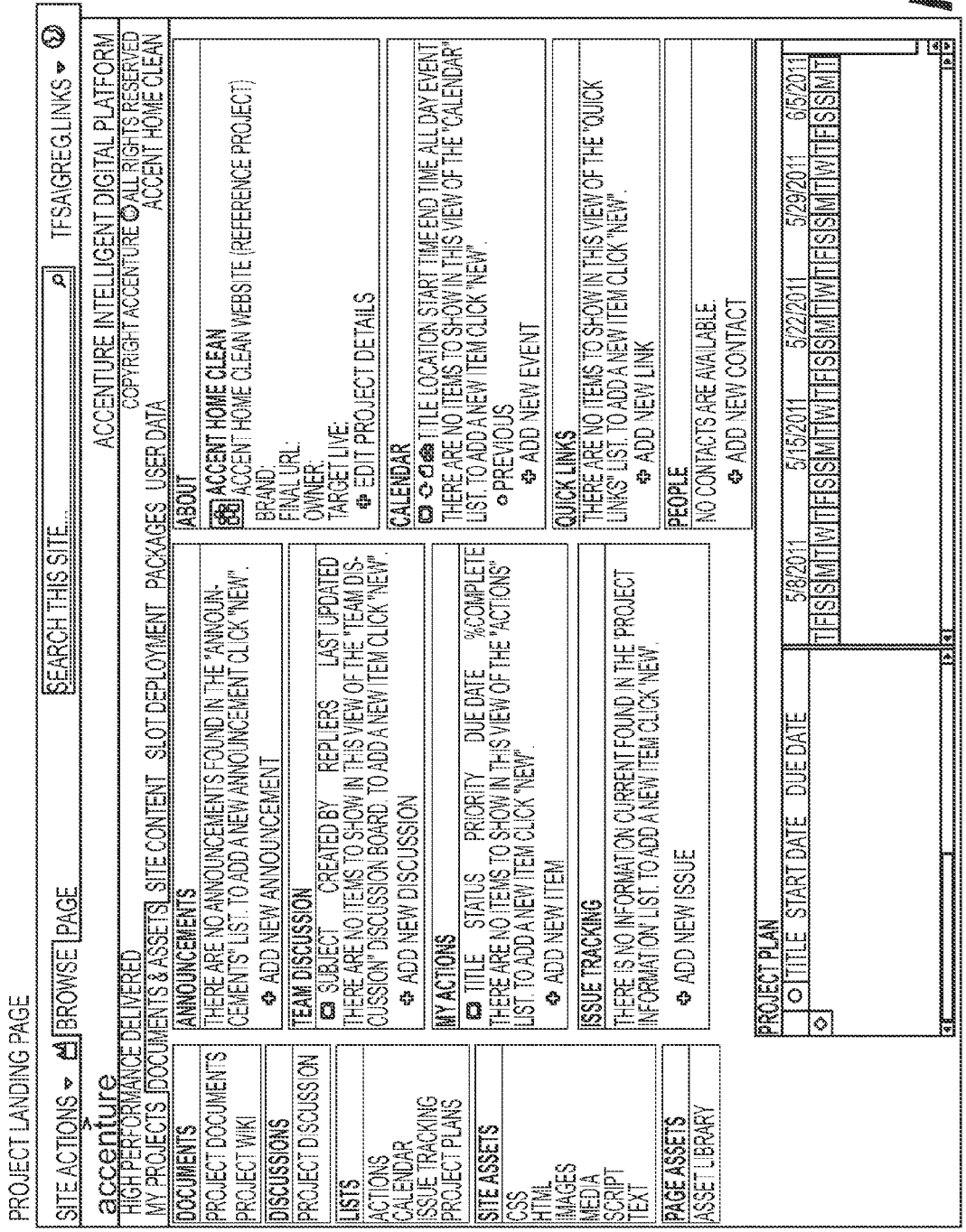

FIGS. 4A-K show examples of screenshots of the CAM UI 204. All the screenshots shown in FIGS. 4A-K, except for screenshot 402 shown in figure 4C which is generated in the code editing system 131, are generated by CAM 101, for example, for a user to interface with CAM 101. FIG. 4A shows a landing page for CAM 101. At the landing page the user has many options for the project, including downloading the SDK for the code editing system 131, accessing existing projects or starting a new project.

FIG. 4B shows an example of a project landing page for the project entitled "Accent Home Clean". For example, the user selects a project from the screenshot shown in FIG. 4A (e.g., "Accent Home Clean" is selected) and the project landing page for the selected project is shown. The user is given access to a collaborative environment for the project, whereby announcements and team discussion can be accessed. Issues for the project can be created and commented on. Also, the workflow of the project may be shown in the calendar.

Also, from the landing page, documents and assets that can be used for the project may be accessed. For example, the content manager 201 shown in FIG. 2 may store the documents and assets in folders for the project. These folders may be accessed from the project landing page. For example, project folders may include site assets, which are static assets for the project. Different types of static assets for the project, which are shown on the left side of the screen shot, may include cascading style sheets (CSS), which may be used as templates, HTML code, images, scripts and text. Also, page assets for the project may be accessed from the landing page.

Figure 4C:
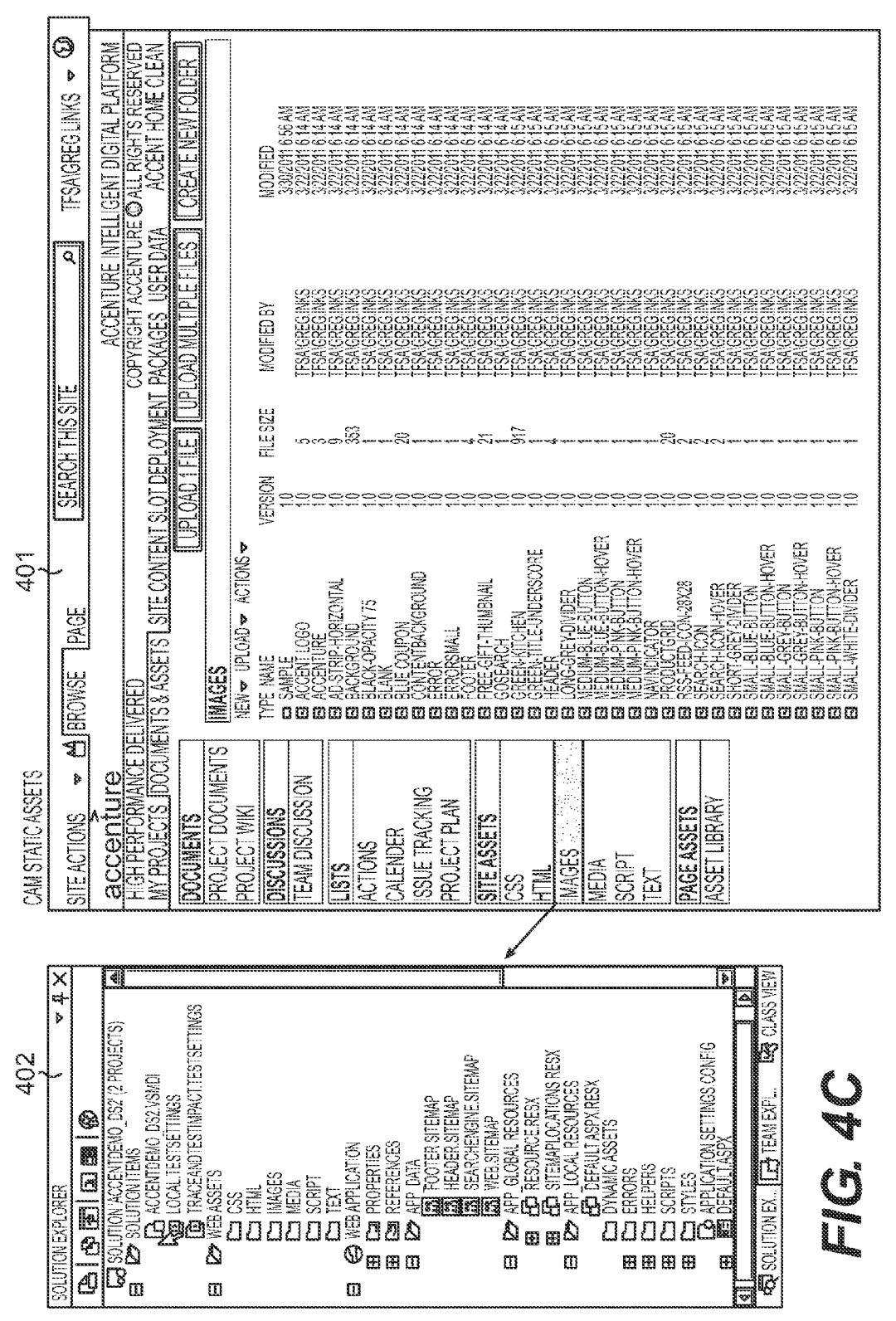

FIG. 4C shows a UI 401 in CAM 101 whereby a user can view image static assets, upload image static assets and create folders for image static assets for the project. UI 401 shows examples of image static assets that may be stored in the repository 210 shown in FIG. 2. Although not shown, folders for the other types of static assets may be presented through UIs.

The image static assets may be available to the code editing system 131 shown in FIG. 2. UI 402 shown in FIG. 4C is a UI generated in the code editing system 131 using the SDK 132 and a web service (e.g., one of the web services 205 shown in FIG. 2) provided by CAM 101 interfacing the code editing system 131 with CAM 101 and the repository 210. The SDK 132 generates the UI 402 and the web service, for example, makes certain folders for the project stored in the repository 210 available through the UI 402. In this example, the static asset folders in the repository 210 for different types of static assets, such as CSS, HTML, images, media, script and text, for the project are shown in the UI 402. The UI 402 shows the folders that may accessed in the code editing system 131 and used in the code for the web site 230.

Figure 4D:
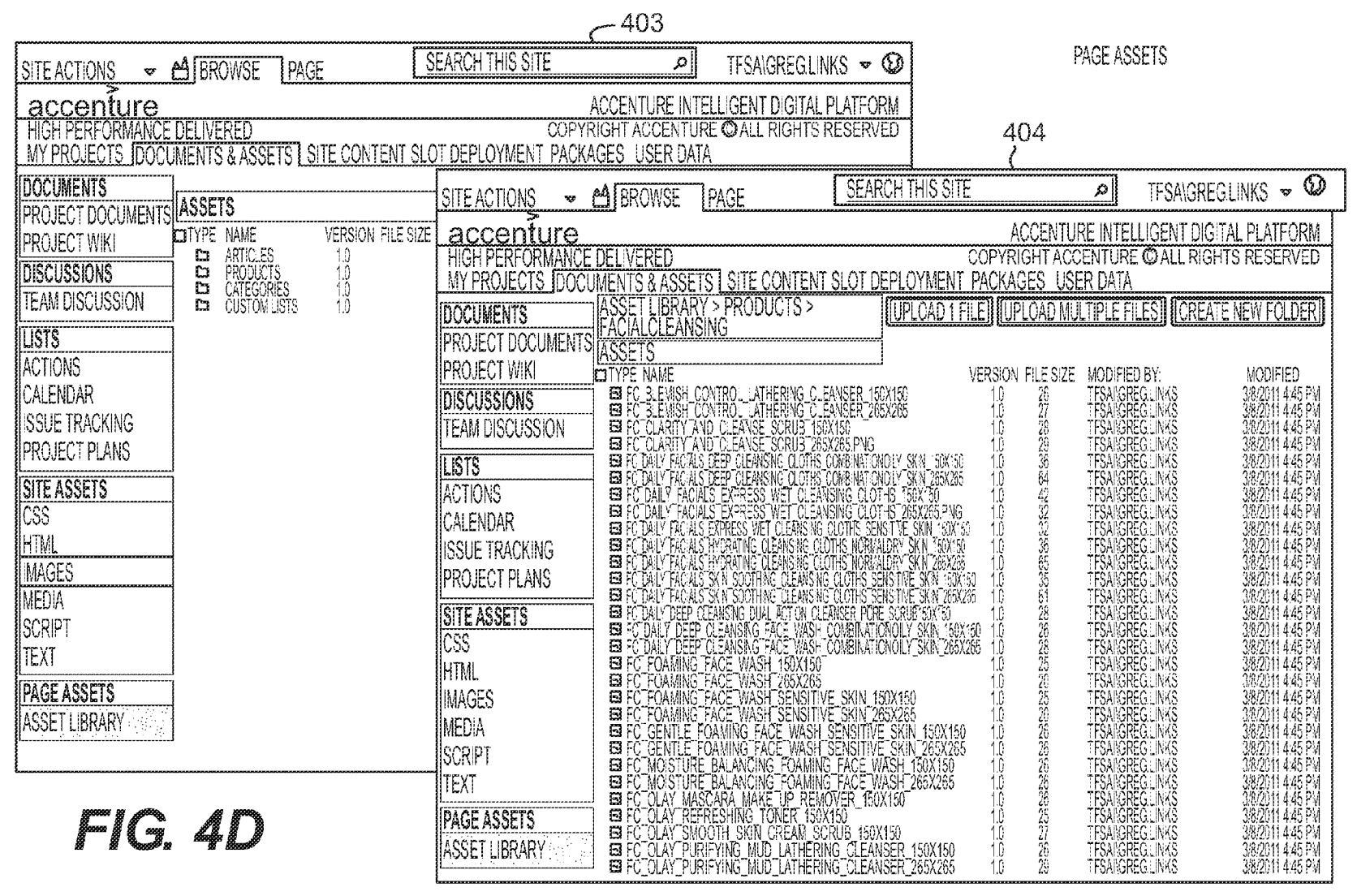

FIG. 4D shows screenshots 403 and 404 showing folders holding page assets. Screenshot 403 shows different types of page assets that may be used in the project, such as articles, products, categories and custom lists. Screenshot 404 shows examples of product page assets related to facial cleansing. One or more of the page assets may be selected for use in the web site 230 through the UI in CAM 101. Also, attributes for the static and page assets are shown by CAM 101. The attributes may include file name, file size, version, description, last modified and who modified, etc.

Figure 4E:
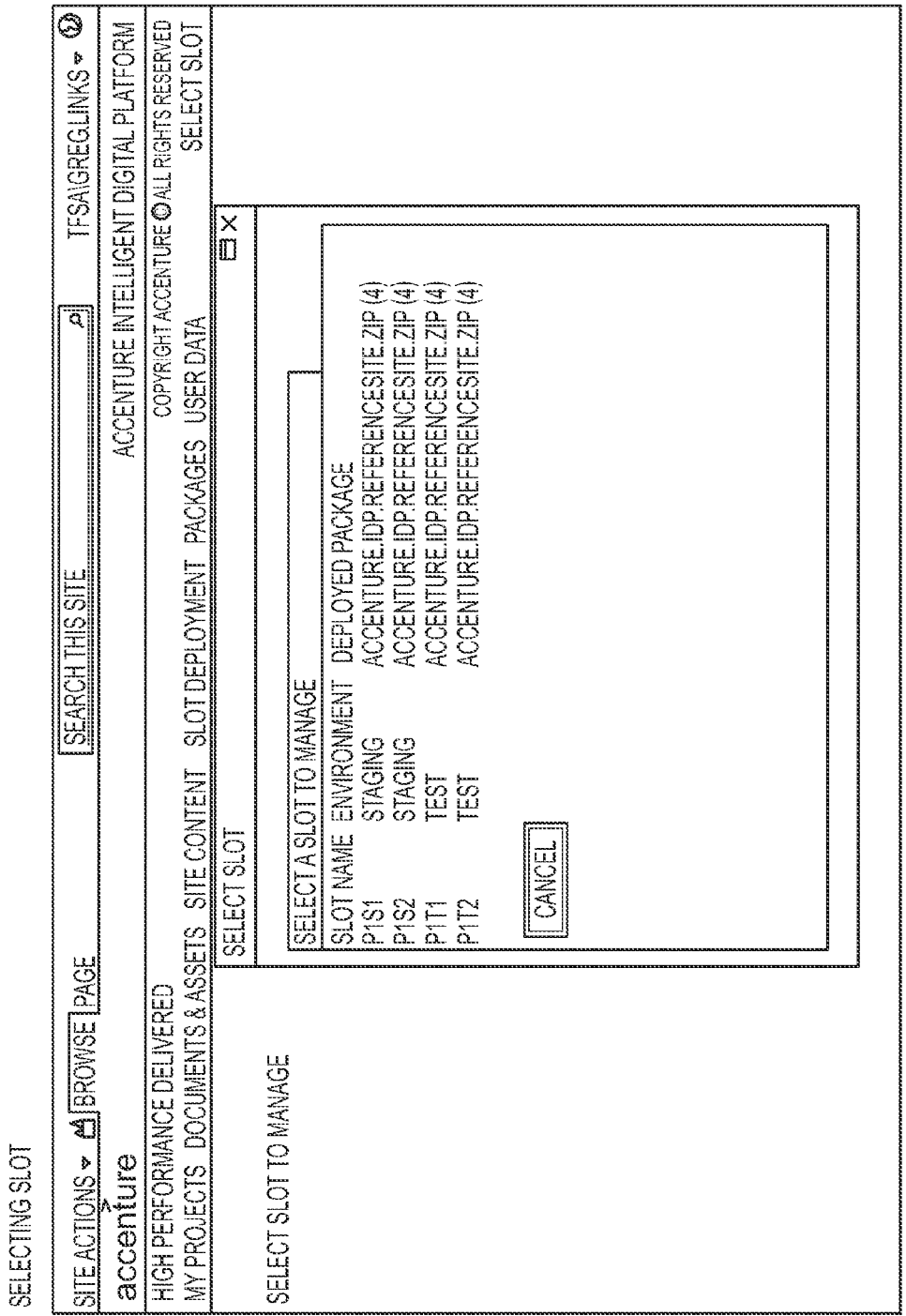

FIG. 4E shows a screenshot for managing slots in the slot database 220 shown in FIG. 2. In FIG. 4E a list of slots are shown that can be managed by the user. Also, different slots may be used for different purposes. For example, slots are shown for staging and testing. A slot may be created for deployment in a runtime environment.

Figure 4F:
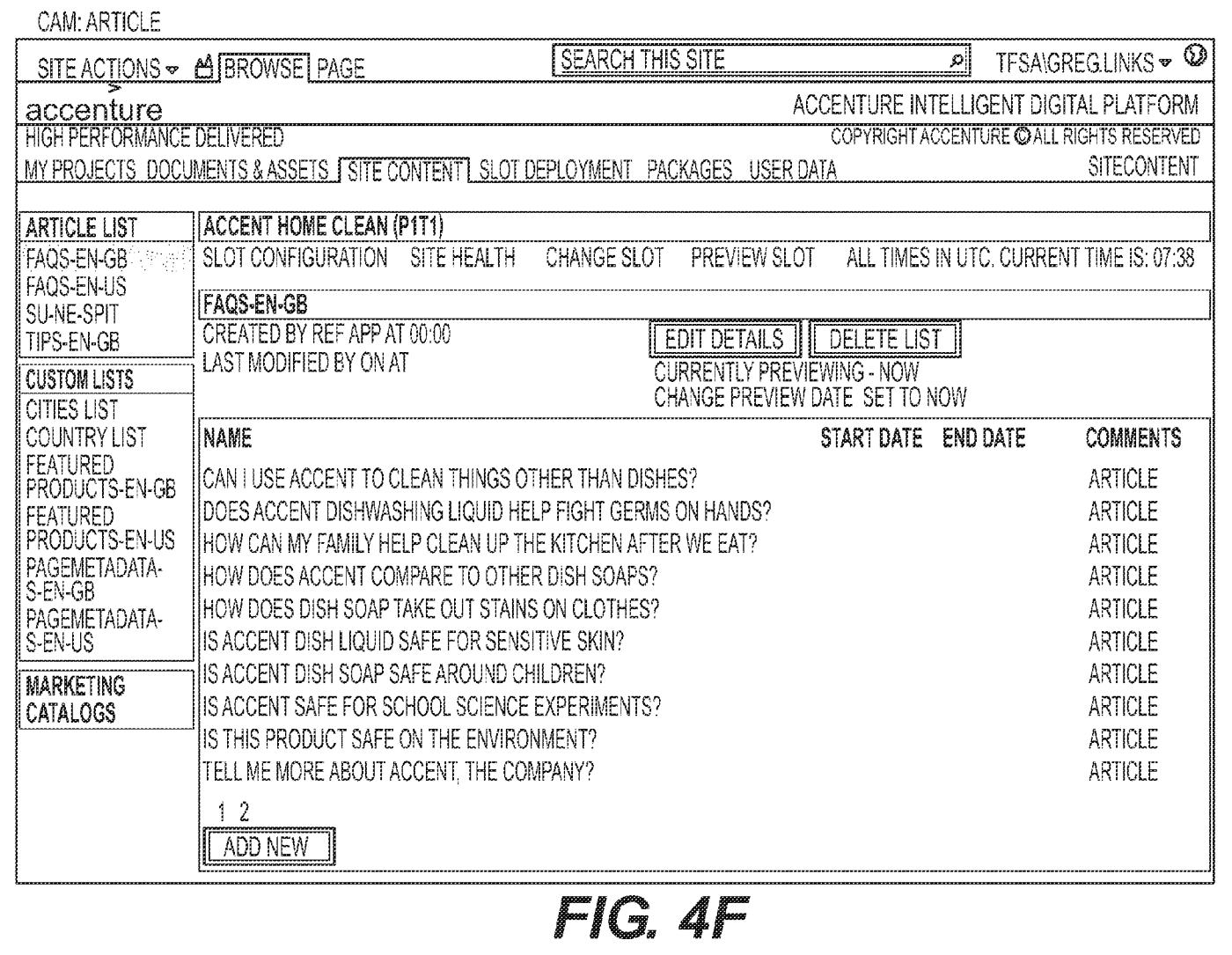

CAM 101 may be used to manage web site content for the web site developed through CAM 101, such as the web site 230. FIG. 4F shows a screenshot for managing web site content. For example, information in the web site, such as article lists, custom lists and catalogs, may be viewed and modified. Slots and site health may be managed. In the example shown in FIG. 4F, the user selected an article list for the web site related to FAQs. All the articles in the selected article list are shown and their attributes.

FIG. 4G shows screenshots 405 and 406 for editing an article. For example, if an article is selected from an article list, the user may modify the article. Screenshot 405 shows editing windows for a name, short description, long description and body of the article. Screenshot 406 shows windows for editing attributes for the article, including image and reference URLS, metadata that may be used to identify the article when searching assets, and start and stop day and times for publishing the article on the web site 230. Custom attributes may also be created for the article. For example, topic is shown as a custom attribute.

CAM 101 allows a user to generate a composite asset comprised of multiple assets. An article is an example of a composite asset. For example, as shown in FIG. 4G, the article may include page assets or static assets comprised of one or more images and/or text.

CAM 101 may be used to generate online catalogs. FIG. 4H shows a screenshot for managing catalogs in site content. Two catalogs are listed for the site in FIG. 4H. A user may add a new catalog to the site or remove or modify an existing catalog. For each catalog, the number of products in each catalog is shown along with the number of categories and last modification date and time. A list of the categories and the products may be shown by selecting a catalog.

Figure 4I:
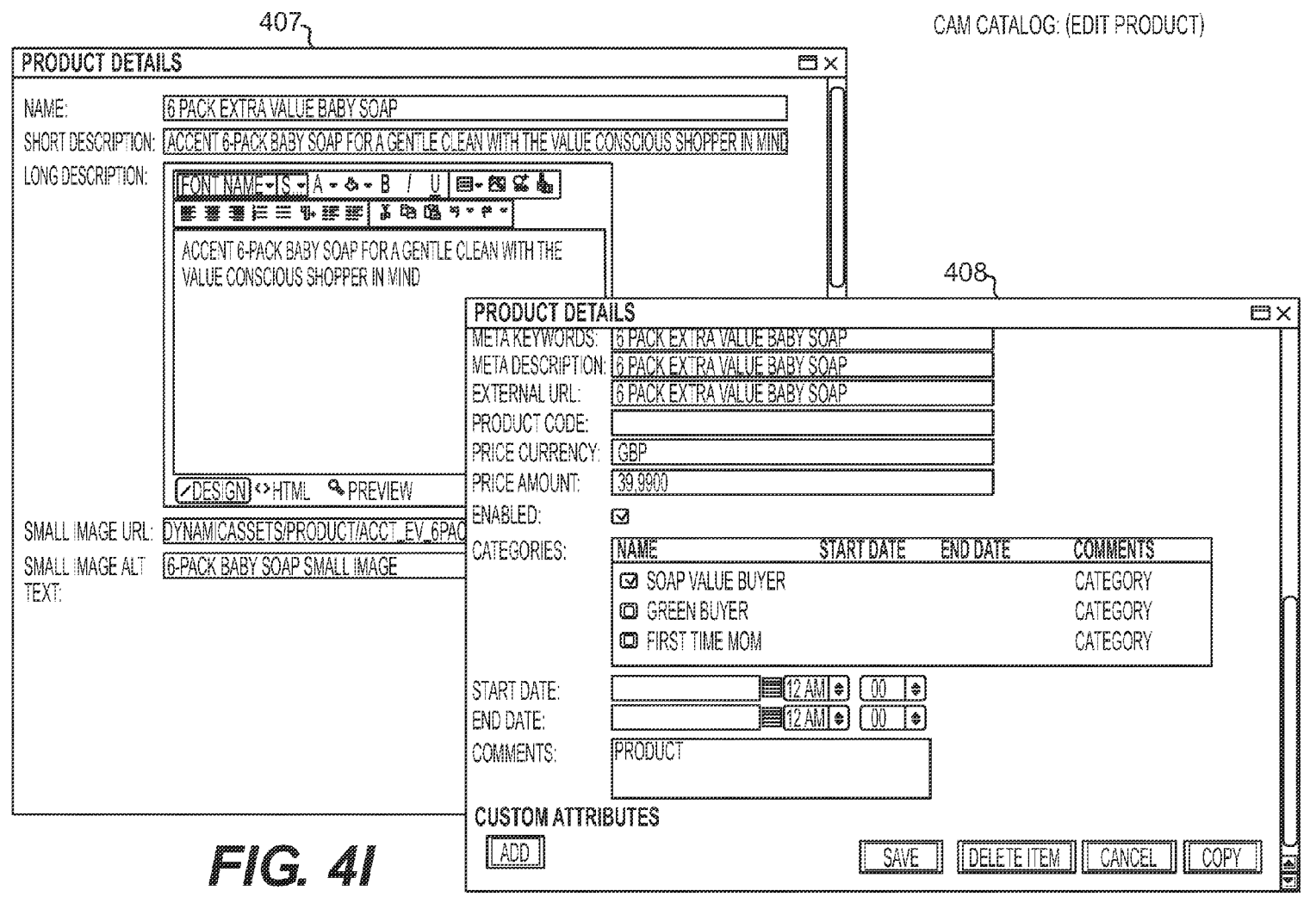

FIG. 4I shows screenshots 407 and 408 for editing product details for a catalog. Screenshot 407 shows windows for editing name, descriptions, and images for a product. Screenshot 408 shows windows for entering meta data for a product. Products codes, prices and categories may be entered. Also, publishing start and stop day and times may be entered. Also, custom attributes may be entered. For example, an attribute may be created for user rating for a product, and the rating may be stored in the repository 210.

The deployment manager 203 shown in FIG. 2 is operable to deploy the web site 230 with all the site content. FIG. 4J shows a screenshot for managing slots for deployment and for viewing information for the deployment and invoking the deployment. The slots stored in the slot database 220 shown in FIG. 2 may include data for the production environment. The slot for the web site 230 may include the code, page assets, and configuration files including web server configurations, system settings and application settings. The slot status is shown, which may be start, stop, or recycle. Recycle may be used to flush a cache if a file in the slot is changed. Configuration files in the slot for deployment in the production environment are shown along with metadata such as who deployed the configuration file and when it was deployed. The slot history is also shown.

FIG. 4K shows a screenshot for a CAM audit history. The audit history specifies details for the project including details for creation and deployment of the web site 230. The audit history may be searched by user or data range. For example, entries in the audit history may show who created an article, extended properties, profiles and user accounts.

5. Methods

Figure 5:
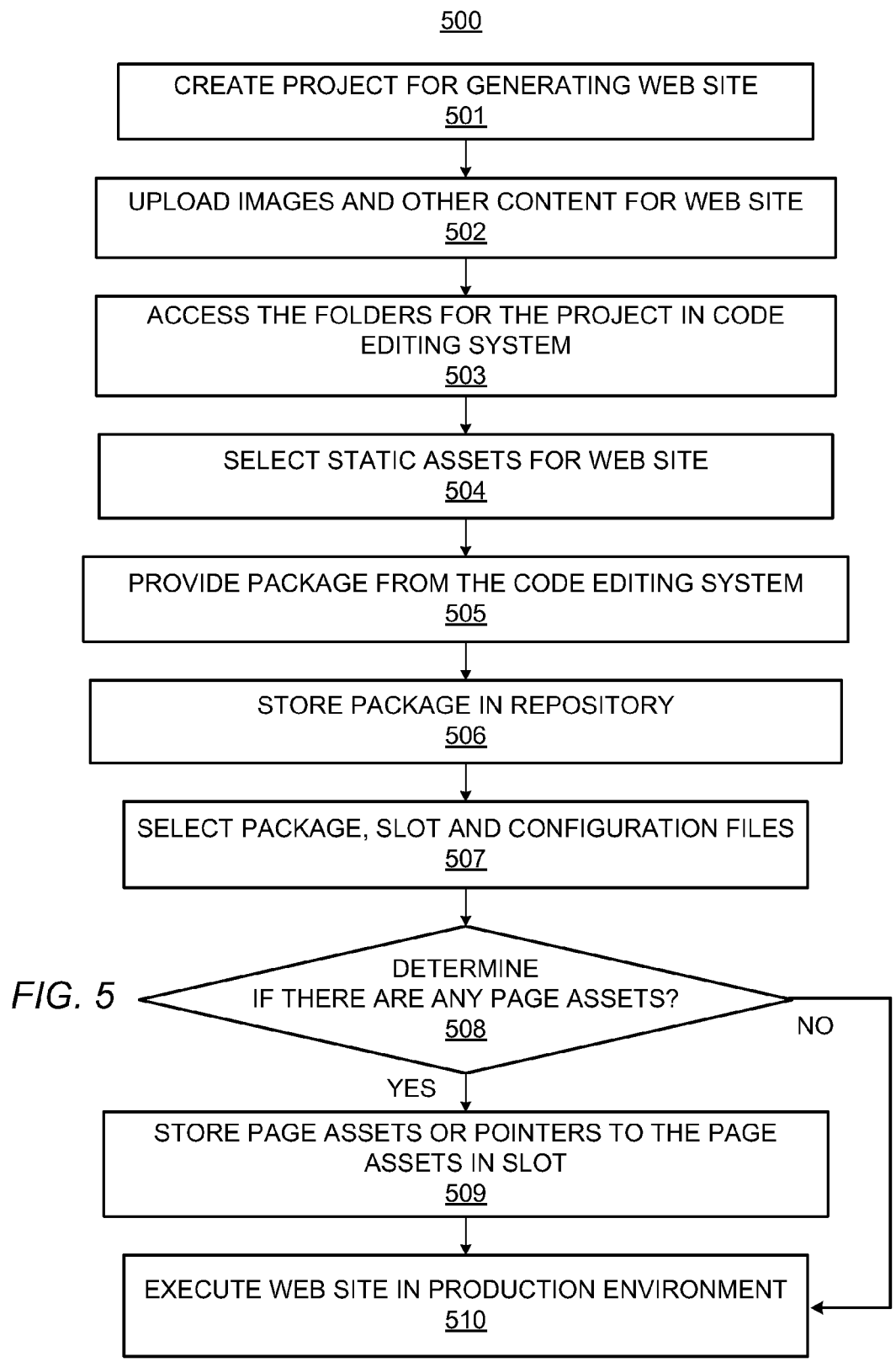
FIG. 5 illustrates a method for creating and deploying a web site, according to an embodiment.

FIG. 5 illustrates a flow chart of a method 500 for generating the web site 230 using CAM 101, according to an embodiment. The method 500 and a method 600 discussed below are described with respect to the system 100 shown in FIGS. 1 and 2 by way of example. The methods may be practiced in other systems. Also, one or more of the steps may be performed in different orders than shown or performed substantially simultaneously.

At step 501, a project may be created for generating the web site 230. Folders may be created for storing content in the repository 210 for the project. The project may be created through the CAM UI 204 or through the code editing system 131 interfacing with CAM 101 through a CAM web service.

At step 502, images and other content for the web site 230 are uploaded into repository 210, for example, through the CAM UI 204. Images and other content may be uploaded into the project folders in the repository 210 or may be selected for the project from content already stored in the repository 210.

At step 503, the developer accesses the folders for the project in the code editing system 131 using a UI generated with the SDK 132. The web service for CAM 101 connects CAM 101 the code editing system 131 to allow access to project folders for the project. For example, the SDK 132 provides a menu option in the code editing system 131 to connect to CAM 101. The web service for CAM 101 connects CAM 101 to the code editing system 131 and provides the developer's ID to CAM 101. If the developer is authorized, a UI is generated in the code editing system 131 listing all the projects the developer is authorized to access. The developer can then select the project.

At step 504, the developer may select static assets for the web site 230. CAM 101 identifies all the static assets in the repository 210 that are available for the project. Metadata may be associated with each asset stored in the repository that indicates whether the asset is a static asset or a page asset and may also indicate which project(s) the asset is associated with.

Static assets that may be available for the project are brought into the code editing system 131 by the CAM web service. For example, the developer may view static assets that are available for the project in a UI in the code editing system 131 created by the SDK 132. The developer may select a static asset, such as an image for a small or medium blue button or an image for a green coupon, which is visible to the developer through the UI. The image is brought into the workspace in the code editing system 131 and becomes part of the code for the web page 230. The code including the static asset may be subsequently modified through the code editing system 131 but may not be modifiable by non-developers through a CAM UI after the code editing system 131 provides the code to CAM 101. The developer may use the test sandpit 134 created by the SDK 132 to test and view the web site 230.

At step 505, the code for the web site 230, including static assets selected at step 504, created by the developer in the code editing system 131 is packaged and provided to the CAM 101. The package includes the code (e.g., HTML), static assets and configuration files, which may include web application configuration files, such as controls, dlls, etc.

At step 506, the content manager 201 stores the package in a project folder in the repository 210.

At step 507, the package, slot and configuration files are selected for deploying. For example, a user in CAM 101 selects the package, selects a slot in the production environment, and configuration files, and instructs CAM 101 to deploy the package. The deployment manager 208 stores the selected package and configuration files in the slot. The slot may include a production database and a web server in the production environment to host the web site 230.

At step 508, CAM 101 determines if there are any page assets for the web site 230. If there any page sites for the web site 230, the page assets or pointers to the page assets are stored in the slot at step 509. For example, the job scheduler 203 may execute a job to move page assets for the web site 230 from a test slot to the selected production slot, or page assets may be moved from the repository 210 to the selected slot. The page assets may be provided in a database package to the slot.

At step 510, the web site is executed in the slot in the production environment.

Figure 6:
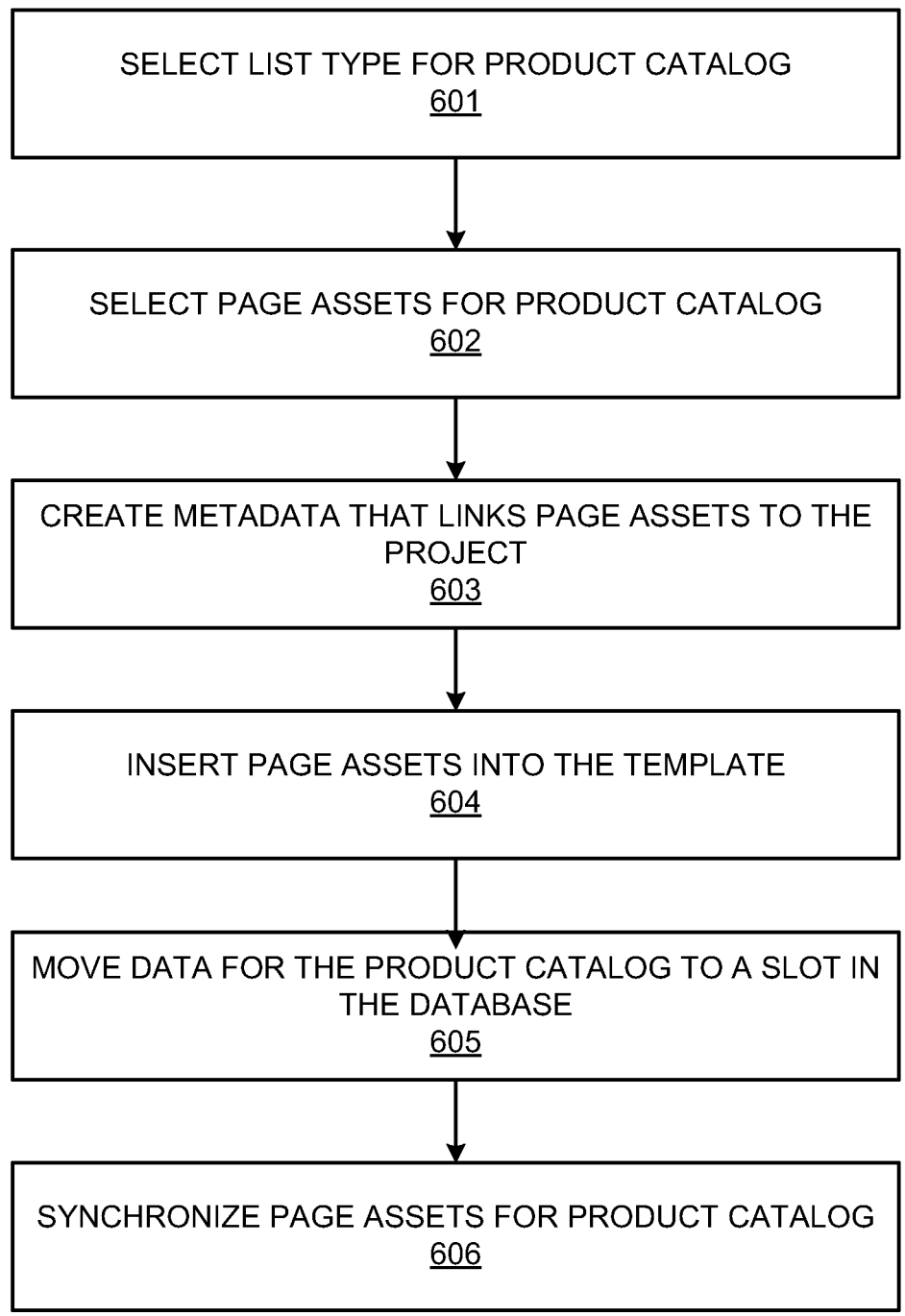
FIG. 6 illustrates a method for creating a web site including page assets, according to an embodiment.

FIG. 6 illustrates a method 600 for creating a web site including page assets through CAM, according to an embodiment. The method 600 is described by way of example with respect to creating a product catalog in the web site 230. Other types of content may be created with page assets.

At step 601, a list type is selected for the web site 230. For example, a user logs into CAM 101 and selects the type of content to be created that includes page assets. For example, the user is presented with an option to select catalog list, article list or custom list. The catalog and article lists are for creating or modifying a catalog or article, which may include one or more page assets. A custom list is an arbitrary set of name-value pairs that can be created by a user. For example, a name "menu" can be associated with various "hyperlinks" that are options in the menu.

Templates may have been created by a developer for the various list types. For example, steps 501-505 in the method 500 may be performed to create a template for a product catalog. The template may include static assets and may have an area for placing page assets. The page assets, however, are not included in the template by the developer through the code editing system 131. Instead, page assets may be added to the template by the user, such as content creators 110b or managers 110c shown in FIG. 1, through the UI 204 in CAM 101.

At step 602, the user selects, through CAM 101, page assets for the product catalog to be included in the web site 230. For example, at step 601, the user selects the product catalog list type, and then page assets may be selected for the product catalog which may be provided in the web site 230. For example, the user views an asset library for the project through CAM UI 204. The user selects one or more page assets for each product. For example, for each product in the catalog, the user selects a product image, a product description and a price description from the page assets.

At step 603, the content manager 201 creates the metadata that links the page assets to the project. The metadata may link each page asset (e.g., image, product description, and price) to its corresponding product for the catalog. For example, the metadata for each page asset is modified to identify the corresponding product. The metadata may be used to group the page assets for the same product or to identify all the page assets for a product by searching the page assets.

At step 604, the content manager 201 inserts the page assets into the template. For example, the template may include locations for the product image, the product description and the price. The page assets or a pointer to the page assets are inserted in their corresponding location in the template. The template may be used for each product in the catalog to insert the corresponding information for each product.

At step 605, the content manager 201 moves the data for the product catalog to a slot in the slot database 220 for deployment of the web site 230.

At step 606, the job scheduler 203 synchronizes page assets for the web site 230 in the slot database 220 according to jobs scheduled for the page assets. For example, the job scheduler 203 receives a job request via CAM UI 204. The job request may indicate to update page assets for the web site 230 weekly. The user may load new page assets in the slot database 220 for one or more of the products in a catalog published in the web site 230. Once a week, the web site 230 is updated with the new page assets.

Figure 7:
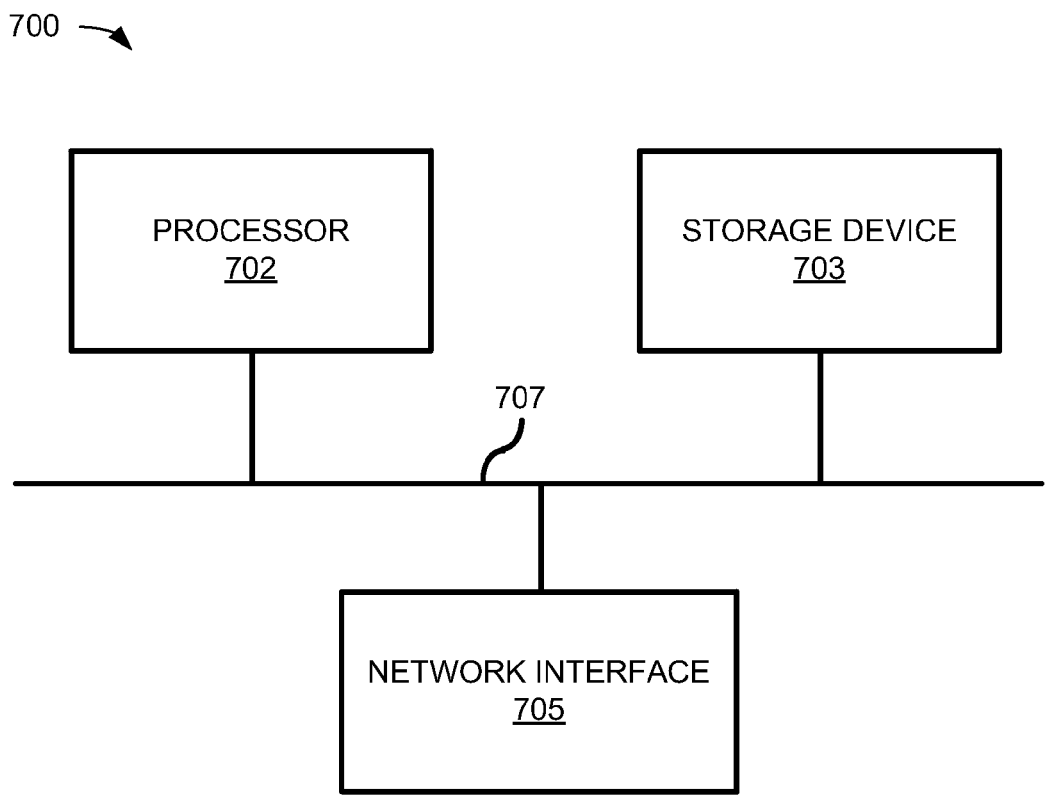
FIG. 7 shows a computer system that may be used as a hardware platform for one or more components of the system in FIGS. 1 and 2, according to an embodiment.

FIG. 7 shows a computer system 700 that may be used as a hardware platform for one or more components of CAM 101 shown in FIGS. 1 and 2. The computer system 700 may be used as a platform for executing one or more of the steps, methods, modules and functions described herein that may be embodied as software stored on one or more computer readable mediums. The computer readable mediums may be non-transitory, such as storage devices including hardware. Also, CAM 101 and other components of the system 100 may be provided in a distributed computing environments, such as a cloud computing environment. For example, the repository 210, CAM 101, developer environment and production environment may be executed on different servers in a cloud computing environment. Furthermore, different components of CAM 101 may be executed on different servers.

The computer system 700 includes a processor 702 or processing circuitry that may implement or execute software instructions performing some or all of the methods, modules, functions and other steps described herein. Commands and data from the processor 702 are communicated over a communication bus 707. The computer system 700 also includes a computer readable storage device 703, such as random access memory (RAM), where the software and data for processor 702 may reside during runtime. The storage device 703 may also include non-volatile data storage. The computer system 700 may include a network interface 705 for connecting to a network. It will be apparent to one of ordinary skill in the art that other known electronic components may be added or substituted in the computer system 700.

One or more of the functions or steps described herein and one or more of the components of the systems described herein may be implemented as computer readable instructions stored on a computer readable medium, such as memory and/or other types of data storage that are non-transitory, and executed on a computer system, for example, by a processor, application-specific integrated circuit (ASIC), or other controller. The code may exist as software program(s) comprised of program instructions in source code, object code, executable code or other formats. Examples of computer readable medium include conventional computer system RAM (random access memory), ROM (read only memory), EPROM (erasable, programmable ROM), EEPROM (electrically erasable, programmable ROM), hard drives, and flash memory.

While the embodiments have been described with reference to examples, those skilled in the art will be able to make various modifications to the described embodiments without departing from the scope of the claimed embodiments.

What is claimed is:

1. A content asset manager (CAM) system managing content to be developed, the CAM system comprising:
   a data repository storing static assets and page assets, including a dynamic asset, operable to be used in a web site developed in a code editing system;
   a web service interfacing the CAM system with the code editing system and providing the code editing system with access to at least some of the static assets stored in the data repository for the CAM system through a user interface in the code editing system and providing code, including at least one of the static assets, for the web site developed in the code editing system to the CAM system;
   a slot database including a plurality of slots that are independent of each other to store data to be used for the web site at runtime, wherein the data stored in each slot is inaccessible by applications in other slots of the slot database;
   a content manager retrieving the code for the web site from the data repository and storing the code for the web site in the slot database, wherein the content manager determines if at least one of the page assets in the repository is to be included in the web site, and if the at least one of the page assets is to be included in the web site, providing the at least one page asset in one of the plurality of slots in the slot database;

a deployment manager deploying the web site in a runtime environment, wherein the code from the slot database and configuration files are provided to one or more servers in the runtime environment, the configuration files including system settings and application settings; and a processor to execute the web service, the content manager and the deployment manager.

2. The CAM system of claim 1, comprising:
a job scheduler scheduling and administering updates to data stored in the slot database that is used at runtime.

3. The CAM system of claim 2, wherein the updates comprise an update to the at least one page asset in the slot database.

4. The CAM system of claim 1, wherein the CAM system receives the page assets from one or more users, and the content manager stores the page assets in the repository.

5. The CAM system of claim 1, wherein the at least one page asset comprises an article, the article being composed of text and another page asset comprised of an image or text.

6. The CAM system of claim 1, wherein the web site comprises an online catalog comprised of at least some of the page assets stored in the repository, and the at least some of the page assets are updated periodically.

7. The CAM system of claim 6, wherein the at least some of the page assets comprise product images, product descriptions and product prices.

8. The CAM system of claim 1, comprising custom logic schemas stored in the data repository, wherein the custom logic schemas are operable to be used as templates for at least one of the page assets.

9. The CAM system of claim 1, wherein the page assets are not accessible in the code editing system.

10. The CAM system of claim 1, wherein each slot in the slot database operates as a virtual container.

11. The CAM system of claim 1, wherein the CAM system provides a software development kit for the code editing system to generate a user interface in the code editing system to access folders in the data repository storing the static assets.

12. A method for managing content with a content access manager (CAM) system comprising:
storing, in a data repository, static assets and page assets operable to be used in a web site developed in a code editing system;
interfacing the CAM system with the code editing system to provide the code editing system with access to at least some of the static assets stored in the data repository through a user interface in the code editing system and to provide code, including at least one of the static assets, for the web site developed in the code editing system to the CAM system;
retrieving the code for the web site from the data repository;
storing the code for the web site in a slot database, wherein the slot database includes a plurality of slots that are independent of each other to store data to be used for the web site at runtime, wherein the data stored in each slot is inaccessible by applications in other slots of the slot database;
determining if at least one of the page assets in the repository is to be included in the web site;
if the at least one of the page assets is to be included in the web site, providing the at least one page asset in one of the plurality of slots in the slot database; and
deploying the web site in a runtime environment, wherein the deploying comprises providing the code from the slot database and providing configuration files to one or more servers in the runtime environment, the configuration files including system settings and application settings.

13. The method of claim 12, comprising:
scheduling and administering updates to the at least one page asset in the slot database that is used at runtime.

14. The method of claim 12, comprising:
providing a user interface for the CAM system enabling users to upload the page assets to the CAM system for storage in the data repository.

15. The method of claim 12, wherein the at least one page asset comprises an article, the article being composed of text and another page asset comprised of an image or text.

16. The method of claim 12, wherein the web site comprises an online catalog comprised of at least some of the page assets stored in the repository, and the page assets are updated periodically.

17. The method of claim 16, wherein the at least some of the page assets comprise product images, product descriptions and product prices.

18. A non-transitory computer readable medium having stored thereon machine readable instructions, the machine readable instructions when executed causes a computer system to perform at least:
storing, in a data repository, static assets and page assets operable to be used in a web site developed in a code editing system;
interfacing a CAM system with the code editing system to provide the code editing system with access to at least some of the static assets stored in the data repository through a user interface in the code editing system and to provide code, including at least one of the static assets, for the web site developed in the code editing system to the CAM system;
retrieving the code for the web site from the data repository;
storing the code for the web site in a slot database, wherein the slot database includes a plurality of slots that are independent of each other to store data to be used for the web site at runtime, wherein the data stored in each slot is inaccessible by applications in other slots of the slot database;
determining if at least one of the page assets in the repository is to be included in the web site;
if the at least one of the page assets is to be included in the web site, providing the at least one page asset in one of the plurality of slots in the slot database; and
deploying the web site in a runtime environment, wherein the deploying comprises providing the code from the slot database and providing configuration files to one or more servers in the runtime environment, the configuration files including system settings and application settings.

* * * * *